Figure 1:
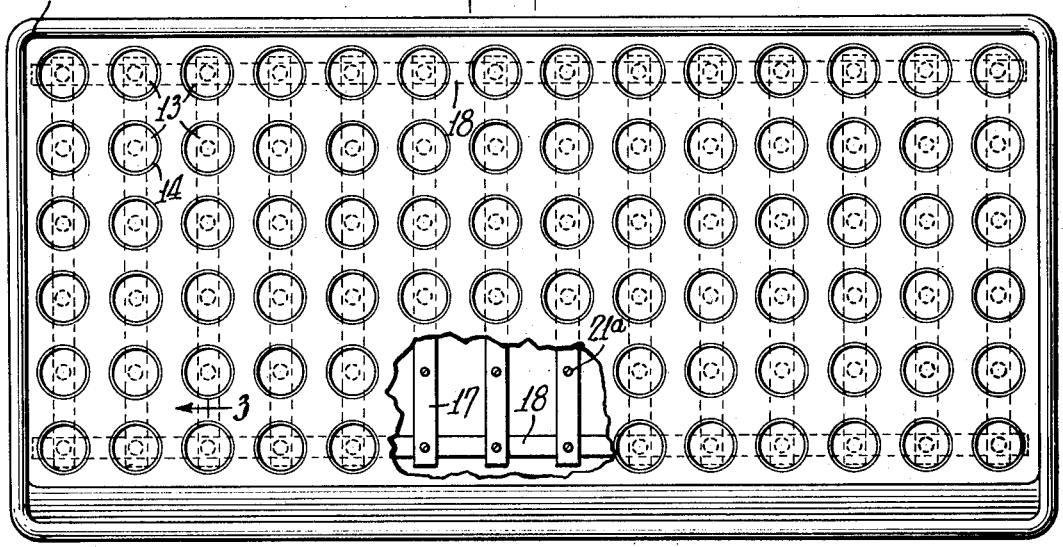

Nov. 10, 1931.  N. M. THOMAS  1,831,047

MULTIPLE FREEZING MOLD

Filed March 6, 1930

INVENTOR
*Norman M. Thomas*
BY
ATTORNEYS

Patented Nov. 10, 1931

1,831,047

UNITED STATES PATENT OFFICE

NORMAN M. THOMAS, OF BROOKLYN, NEW YORK, ASSIGNOR, BY MESNE ASSIGNMENTS, TO POPSICLE SERVICE, INC., OF CHICAGO, ILLINOIS, A CORPORATION OF ILLINOIS

MULTIPLE FREEZING MOLD

Application filed March 6, 1930. Serial No. 433,608.

The device of the present invention, while particularly designed as a multiple freezing mold for frozen confections of the general character disclosed in prior patent to James S. Valentine, No. 1,563,121, granted November 24th, 1925, may have a wide and varied range of utility in other arts where a plurality of molds or containers of liquid or semi-liquid materials are to be simultaneously treated.

An object of the present invention is to provide a mold of this general character which will be highly sanitary in use, affording no crevices in the pan, in the molds or at the junction of the pan and molds in which the fruit syrup or other material to be frozen might possibly accumulate and ferment.

Another object of the invention is to provide a mold in which the pan and the mold members are of unitary construction in the completed article and in which the danger of displacement of the pendant molds relative to each other or of injury to the molds is reduced to a minimum.

A more specific object of the invention is to provide a metal plated article of the character above described which is totally devoid of solder seams that are apt to open during a replating process and that would therefore necessitate resoldering after each replating operation.

Another object is to provide a pan and mold arrangement of such rugged and durable construction that neither rough usage nor careless handling are apt to injure any of the constituent parts of the device, to bend or dent the mold tubes or to break them away from the pan.

Another object is to provide improved means for bracing all of the individual tubes against relative movement and for maintaining the tube bottoms out of contact with a table or floor during the normal course of handling of the molds.

In a preferred embodiment of the invention the shallow pan portion or funnel portion of the mold is worked from a single sheet of metal completely devoid internally of square corners or sharp lines of junction between its upstanding walls and its bottom. The tapering tubes with their closed bottoms are seamless, preferably of drawn metal, and the open mouths of the tubes are applied at corresponding openings in the pan by a crimping operation which obviates the need for special securing means and assures a firm connection.

Preferably the tubes are arranged in transverse and longitudinal rows, the transverse rows being connected at their lower ends by cross-bracing members which in turn connect with longitudinal supporting runners arranged at or adjacent opposite sides of the assemblage.

Means is provided for effecting the attachment of the molds or tubes to the cross braces and to the runners without perforating the tubes themselves. Preferably, an external collar is drawn from the bottom of each tube during the tube forming operation, said collar defining a downwardly facing socket. These collars are worked inwardly over the heads of rivets which pass through the cross braces and are riveted over against the undersides of the latter. The rivets of those tubes directly over the runners pass through both the cross braces and the runners and are riveted over into suitable counter-sunk sockets at the lower faces of the runners thereby avoiding the danger of shearing off the rivet heads after protracted sliding of the mold unit on its runners.

Figure 2:
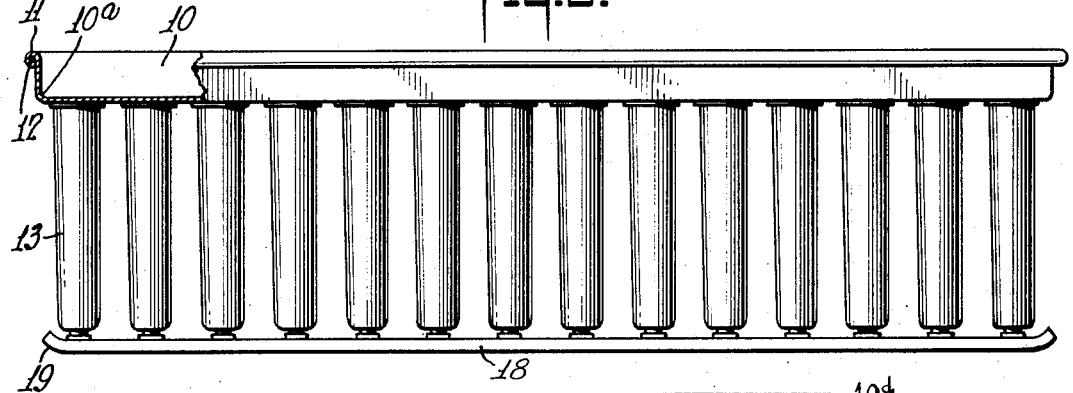

The invention may be more fully understood from the following description in connection with the accompanying drawings wherein, Fig. 1 is a top plan view of a mold unit embodying the invention with part of the pan and some of the mold tubes broken away to expose the cross bracing and runner construction upon which the unit is supported, Fig. 2 is a side elevational view of the unit with part of the pan broken away and in section for clearness.

Figure 3:
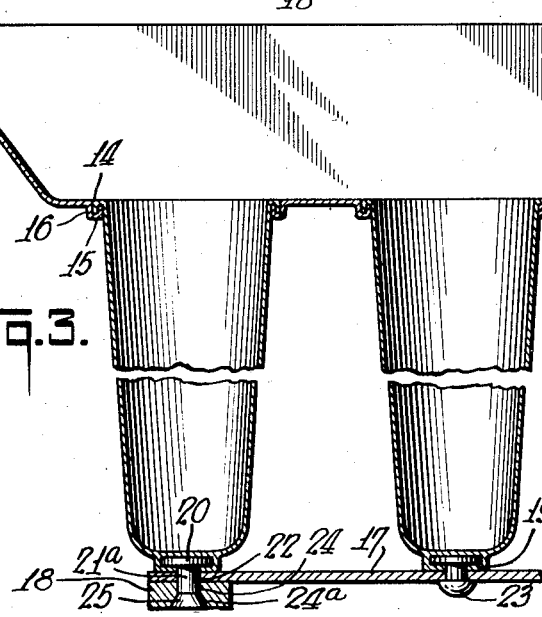
Figure 4:
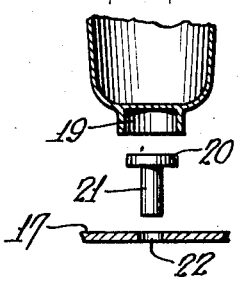

Fig. 3 is an enlarged broken fragmentary vertical sectional detail taken approximately on the line 3—3 of Fig. 1, and Fig. 4 is a somewhat diagrammatic disassembled sectional detail showing the relation of a tube, rivet and brace prior to riveting.

The pan 10 which may be of any desired size and shape but is preferably of elongated, rectangular form is pressed out or otherwise worked from a single sheet of material in such manner that it is internally devoid of sharp corners or angles and provides an integral rounded union at 10a between the upstanding pan walls and the pan bottom and an integral rounded union at 10b between the side walls and the end walls of the pan. If desired the customary bead 11 may be rolled outwardly from the lip of the pan around a reinforcing wire or equivalent 12. As in the prior patent above referred to, one wall 10c of the pan may be inclined outwardly to form a pouring lip while the other walls 10d are substantially straight.

The mold tubes 13 are of generally cylindrical elongated form drawn from flat metal plates and tapering toward their rounded bottoms to facilitate withdrawal of the frozen confections from them. The mouths of the tubes are passed through corresponding openings in the bottom of pan 10 and the lips 14 of the tubes are bent outwardly and downwardly into engagement with the inwardly and upwardly bent lips 15 of pendant flanges 16 integral with the pan and encircling the openings. Thus the hook shaped lips 14 and 15 interlock and may be crimped together in any suitable manner usually by pressure to effect a firm interlock between the tube mouths and the pan. It will be readily understood that proper performance of this crimping operation will leave no crevices exposed to liquid which may be poured into the pan and the effect of the crimping is to render the pan and the tubes subsantially unitary.

The tubes are arranged in transverse and longitudinal rows, the bottoms of the tubes of the transverse rows being connected by transverse bracing bars 17 and the ends of these bars together with the outer longitudinal rows of tubes being connected to longitudinally extending runners 18 having upturned ends at 19 to facilitate sliding of the mold units.

A feature of the invention is the manner in which the seamless drawn copper tubes are attached to the cross braces and the runners without the need for perforating the tubes themselves. To accomplish this result the drawing operation on the tubes is accompanied by the drawing out of an integral socket forming collar 19 externally of the tube bottoms. This socket is of sufficient size to receive the head 20 of a rivet 21. The collar is spun or otherwise worked down about the rivet head to lock the rivet to the tube as at 19'. The shank of the rivet is then passed through a corresponding opening 22 in the cross brace 17 and headed over as indicated at 23. Fig. 4 shows the position of the parts prior to applying the rivet to the tube and riveting the tube to the cross brace whereas Fig. 3 shows the parts in their assembled relationship.

The connection of the runners to the cross braces is effected by corresponding rivets 21a which may be of slightly greater length than the rivets 21. The shanks of these rivets pass through aligned openings 22 and 24 in the cross braces and the runners and have their heads 25 riveted over into countersunk enlargements 24a of the openings 24. This construction prevents rubbing of the rivet heads against the surface over which the mold unit is slid and consequently it minimizes the danger of the rivet heads being rubbed or sheared off after protracted use.

From the foregoing it will be apparent that the entire mold unit is devoid of soldered joints and that that portion of the unit which comes in contact with the syrup or the like to be frozen is devoid of any crevices or joints in which the product to be frozen might accumulate and subsequently rot or ferment. Also it will be evident that in the absence of soldered joints or seams of any character the mold units, which are preferably tin plated, may be replated at the necessary intervals and the plating process carried on at high temperatures without danger of opening up seams and without the need for and cost of resoldering operations.

The rigidity of the construction is such that the mold units will stand rough handling, without danger of breakage.

To wash the mold unit it is merely necessary to immerse it in hot water and then invert it so that the water may drain from the individual molding tubes.

In use the syrup or other liquid to be frozen is poured into the pan which serves as a funnel and drains into the respective molding forms. A common liquid level may be obtained in the various molds by the spilling or draining process described in the above mentioned patent to Valentine. Where handle sticks are to be frozen into the confections, these sticks are inserted into the mold forms and held centered and against floating upwardly by any means (not germane to the present invention).

The molding unit is then slid into the freezing chamber and when the confections have become frozen to the proper consistency, the unit is removed, the molding forms heated and the confections withdrawn.

Obviously the shape of the individual mold forms may be considerably varied to meet the requirements of the trade.

It will thus be seen that there is herein described apparatus in which the several features of this invention are embodied, and which apparatus in its action attains the various objects of the invention and is well suited to meet the requirements of practical use.

As many changes could be made in the above construction, and many apparently widely different embodiments of this invention could be made without departing from the scope thereof, it is intended that all matter contained in the above description or shown in the accompanying drawings shall be interpreted as illustrative and not in a limiting sense.

Having thus described my invention, what I claim as new and desire to secure by Letters Patent is:

1. A multiple mold of the class described including a pan, an elongated mold having a closed bottom and of drawn metal having its mouth fixed in a corresponding opening in the pan, said mold at its bottom having a drawn external collar portion adapted to be worked inwardly over the head of a securing device disposed externally of the mold.

2. A multiple mold of the class described including a pan, elongated molds of drawn metal having closed bottoms and having their mouths fixed in corresponding openings in the pan, said molds at their bottoms having drawn external collar portions adapted to be worked inwardly over the heads of securing devices disposed externally of the molds, and bracing members connecting the bottoms of the molds, the pendant shanks of said securing devices passing through the bracing members and being headed over against the under faces thereof.

3. A multiple mold unit of the class described including a plurality of generally cylindrical mold elements having closed bottoms and open tops, means rigidly securing said elements together at their bottoms and tops and runners on which the lower securing means are supported, means for securing the bracing strips and runners to the molding forms, comprising rivets passed through the bracing strips and runners and including head portions spun into deformable external collars integral with the mold bottoms.

4. A multiple mold of the class described including a pan formed of a single piece of material, a plurality of transverse and longitudinal rows of elongated molds of drawn metal having closed bottoms and having their mouths fixed in corresponding openings in the pan, each mold at its bottom having an integrally drawn external collar portion adapted to be worked inwardly over the head of a rivet disposed exteriorly of the mold, transverse bracing strips connecting the bottoms of transverse rows of molds, the pendant shanks of such rivets passing through the bracing members and being headed over against the under faces thereof.

5. A multiple mold of the class described including a pan formed of a single piece of material, a plurality of transverse and longitudinal rows of elongated molds of drawn metal having closed bottoms and having their mouths fixed in corresponding openings in the pan, each mold at its bottom having an integrally drawn external collar portion adapted to be worked inwardly over the head of a rivet disposed exteriorly of the mold, transverse bracing strips connecting the bottoms of transverse rows of molds, the pendant shanks of such rivets passing through the bracing members and being headed over against the under faces thereof, runners extending longitudinally of the assemblage under the bracing strips, said runners having openings therein in line with the openings in the bracing members and having countersinks in their under faces, whereby the shanks of certain of the rivets pass through both bracing members and runners and the lower heads of the rivets are upset in the countersinks to prevent wear on the rivet heads during sliding of the assemblage along its runners.

6. A multiple mold of the class described including a pan formed of a single piece of material, a plurality of transverse and longitudinal rows of elongated molds of drawn metal having closed bottoms and having their mouths fixed in corresponding openings in the pan, each mold at its bottom having an integrally drawn external collar portion adapted to be worked inwardly over the head of a rivet disposed exteriorly of the mold, transverse bracing strips connecting the bottoms of transverse rows of molds, the pendant shanks of such rivets passing through the bracing members and being headed over against the under faces thereof, runners extending longitudinally of the assemblage under the bracing strips, said runners having openings therein in line with the openings in the bracing members and having countersinks in their under faces, whereby the shanks of certain of the rivets pass through both bracing members and runners and the lower heads of the rivets are upset in the countersinks to prevent wear on the rivet heads during sliding of the assemblage along its runners, the mouths of the molds and the walls of the corresponding openings in the pan being crimped into liquid-tight, secure engagement substantially without the formation of crevices at the mouths of the molds.

Signed at New York, in the county of New York and State of New York this 4th day of March, A. D. 1930.

NORMAN M. THOMAS.